Feb. 13, 1934.   J. Q. SHUNK   1,947,363
OSCILLATING AXLE FOR VEHICLES
Filed April 9, 1931
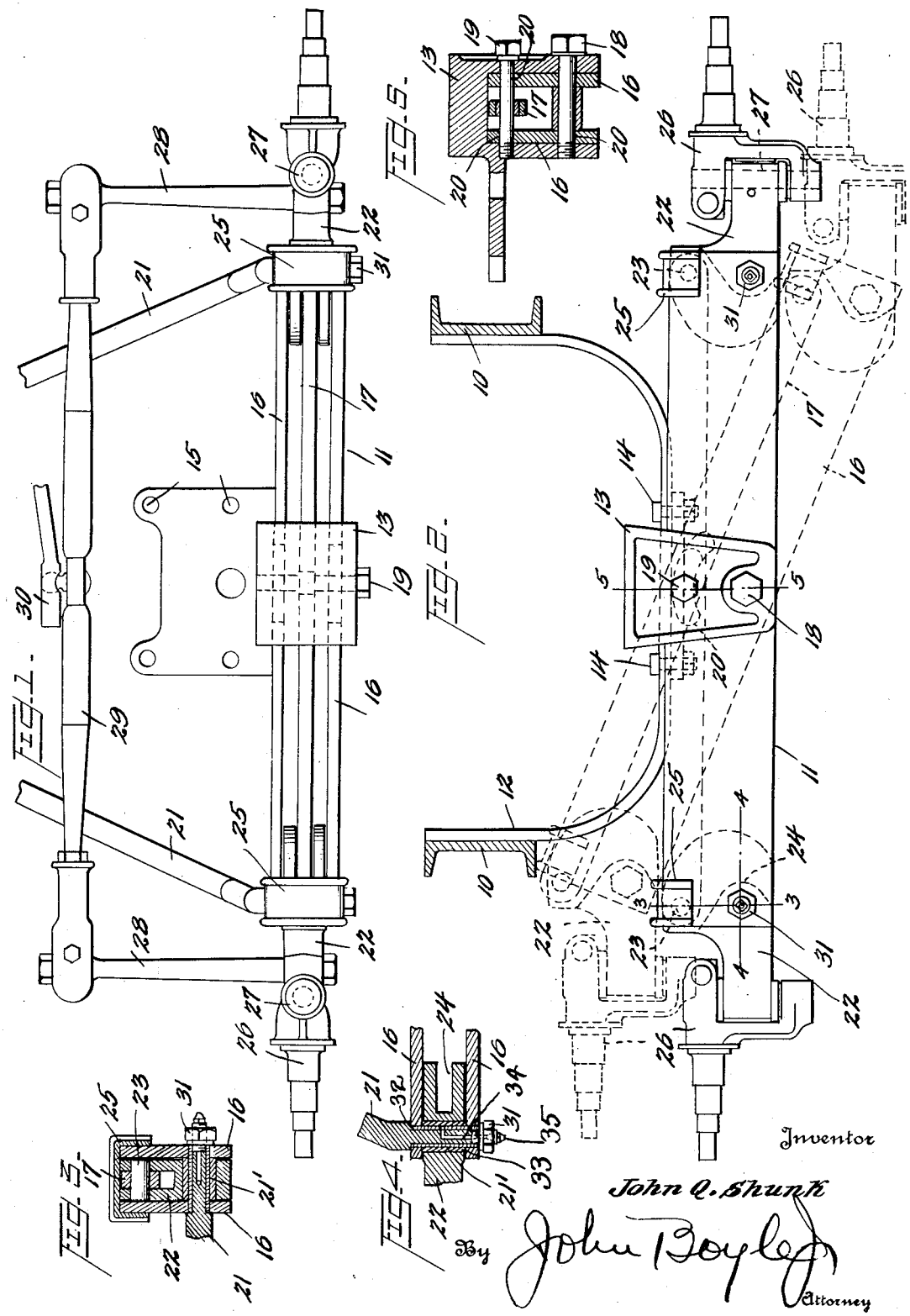
Inventor
John Q. Shunk
By John Boyle
Attorney Patented Feb. 13, 1934

1,947,363

UNITED STATES PATENT OFFICE 1,947,363

OSCILLATING AXLE FOR VEHICLES

John Q. Shunk, Bucyrus, Ohio

Application April 9, 1931. Serial No. 528,943

7 Claims. (Cl. 280—111)

My invention relates to an oscillating axle for motor vehicles.

One of the objects is to provide a front axle that in addition to supporting the front of the vehicle and performing all the ordinary functions of steering, is free to oscillate within limits fixed by the carrying head or support, the wheels remaining vertical at all times. In carrying heavy loads over rough and broken ground, the oscillation of the front axle allows the front wheels to follow the contour without transmitting such movement to the chassis, the chassis and body moving along on an even plane with no appreciable side rock, as as the case with vehicles not provided with a freely oscillating axle.

Referring to the drawing for a more complete disclosure of the invention

Fig. 1 is a plan view,

Fig. 2 is a front elevation,

Fig. 3 is a section on the line 3—3 of Fig. 2,

Fig. 4 is a section on the line 4—4 of Fig. 2, and

Fig. 5 is a section on the line 5—5 of Fig. 2.

The axle 11 is supported from and between the main frames 10 of the vehicle, by the yoke 12 which also may serve as the mounting and carrier for the front end of the power unit. To the underside of the yoke, the carrying head or support 13 is secured by bolts 14 passing through the apertures 15 in the head.

The axle 11 comprises front and rear axle bars 16 and an equalizing bar 17. The axle bars are pivoted between the depending arms of the head 13 through the medium of the bolt 18 and the equalizing bar is pivoted to the said head by means of the bolt 19. The axle bars are provided with a circular slot 20, the radius of the circle having as its center the bolt 18, the dimensions of the said slot being such that the equalizing bolt 19 will pass through it freely. From the above construction, it will be clear that the axle bars 16 and equalizing bar 17 are free to oscillate on their respective fixed pivots 18 and 19. The pivot points may be provided with proper wear resisting bushings and are properly lubricated.

At each end of the axle bars 16 is a hole through which passes the front ends 21' of the radius rods 21. On these ends 20 are rotatably mounted the spindle brackets 22, which are pivotally connected at 23 to the outer ends of the equalizing bar, and slotted at 24, so as to receive the equalizing bar.

A nut 31 engaging each end of the radius rod holds the parts in assembled relationship. Hardened bushings 32 and 33 are interposed between the moving parts. A lubricating channel 34 is drilled in the radius rod and is provided with a pressure lubricating fitting 35.

By this construction, the spindle bracket rotates about the fixed pivot 21' between the axle bars 16 without any perceptible side movement or play. Any up or down movement of the ends of the axle bars imparts a corresponding movement to the equalizing bar and since the pivotal connections of the respective bars to the spindle brackets are equally spaced, they will remain in vertical alinement irrespective of the angle of the axle to the horizontal and consequently the spindle bracket will always be in vertical position.

A clamp 25 fitting over the top and end of the axle bars serves to hold them from spreading in the event of a side twist, the said clamp also serving as an axle stop when it contacts with the main frame 10. The steering knuckle 26 mounted on the pivot 27, the steering knuckle arm 28, tie rod 29 and drag link 30 are all conventional design and their respective functions are common to all motor vehicles.

I claim:

1. An oscillating axle for vehicles comprising spaced flat, wide front and rear axle bars, an equalizing bar between them, the axle bars being on opposite sides of the equalizing bar, wheel brackets, the said bars being pivoted at their ends to the wheel brackets and intermediate their ends to the vehicle frame, the said wheel brackets being provided with an elongated extension that fits between the said axle bars to transmit the impact on the wheels of the vehicle to the said axle bars.

2. An oscillating axle for vehicles comprising spaced front and rear axle bars, an equalizing bar between them, the axle bars being on opposite sides of the equalizing bar, wheel brackets, the said bars being pivoted at their ends to the wheel brackets and intermediate their ends to the vehicle frame, a radius rod for the vehicle the pivot of the wheel bracket carried by the axle bar being formed by an extension of the radius rod.

3. An oscillating axle for vehicles comprising spaced front and rear axle bars, an equalizing bar between them wheel brackets, the said bars being pivoted at their ends to the wheel brackets and intermediate their ends to the vehicle frame and a clamp fitting over the end of the axle bars to hold them from spreading.

4. An oscillating axle for vehicles comprising an axle bar, wheel brackets pivoted thereto, a radius rod for the vehicle the pivot for the wheel bracket being formed by an extension of the said radius rod of the vehicle.

5. An oscillating axle for vehicles comprising spaced front and rear axle bars, an equalizing bar between them, the axle bars being on opposite sides of the equalizing bar, wheel brackets pivoted to the axle bar and provided with a forked elongated extension that fits between the said axle bars to transmit the impact on the wheels of the vehicle to the said axle bars, the equalizing bar being pivoted at its ends between the said forked extension, the said equalizing and axle bars being pivoted intermediate their ends to the vehicle frame.

6. An oscillating axle for vehicles comprising spaced front and rear axle bars made of heavy flat plates, an equalizing bar between them, the axle bars being on opposite sides of the equalizing bar, wheel brackets pivoted between the ends of the axle bars, a radius rod for the vehicle the pivot for the wheel brackets being formed by an extension of the radius rod, the said wheel brackets being provided with an elongated extension, the equalizing bar being pivoted at its ends to the said extensions, the said equalizing and axle bars being pivoted intermediate their ends to the vehicle frame.

7. An oscillating axle for vehicles comprising spaced front and rear axle bars, an equalizing bar between them, wheel brackets pivoted to the axle bars, a radius rod for the vehicle, the pivot for the wheel brackets being formed by an extension of the said radius rod of the vehicle.

JOHN Q. SHUNK.